A. G. ELVIN & F. W. MARTIN.
SWIVEL PIPE JOINT.
APPLICATION FILED JULY 30, 1913.
1,171,416.
Patented Feb. 15, 1916.
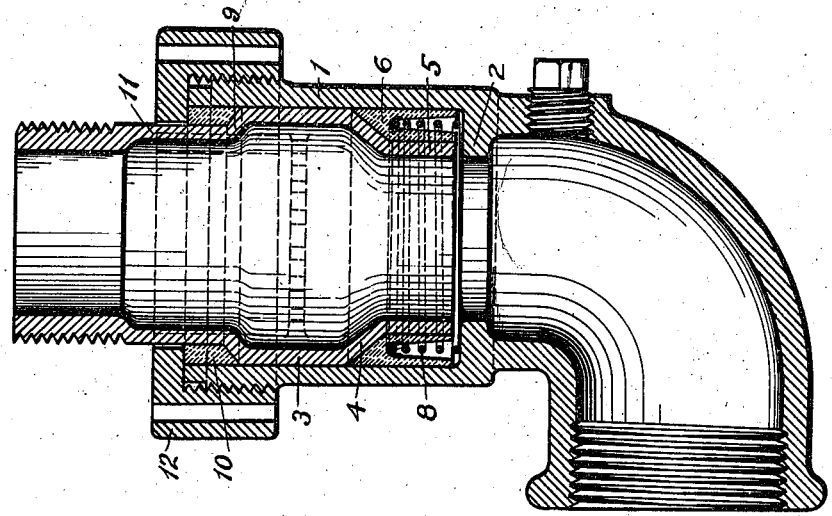
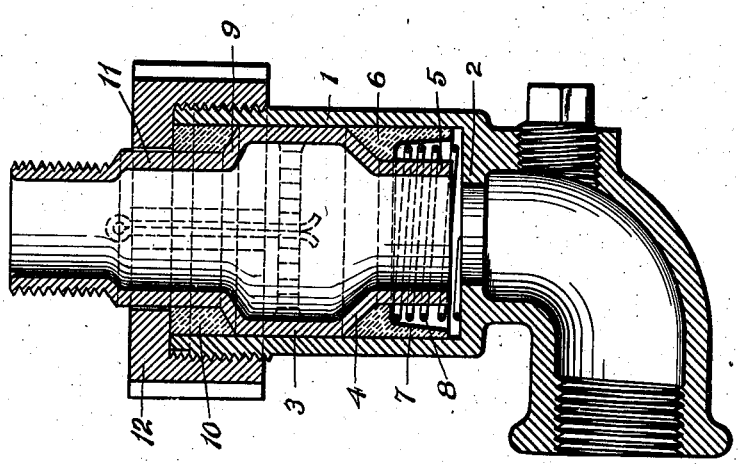
WITNESSES
INVENTORS

UNITED STATES PATENT OFFICE.

ALBERT G. ELVIN, OF SOMERVILLE, NEW JERSEY, AND FREDERICK W. MARTIN, OF NEW YORK, N. Y., ASSIGNORS, BY DIRECT AND MESNE ASSIGNMENTS, TO FRANKLIN RAILWAY SUPPLY COMPANY, OF WILMINGTON, DELAWARE, A CORPORATION OF DELAWARE.

SWIVEL PIPE-JOINT.

1,171,416.

Specification of Letters Patent.  Patented Feb. 15, 1916.

Application filed July 30, 1913. Serial No. 781,941.

*To all whom it may concern:*

Be it known that we, ALBERT G. ELVIN and FREDERICK W. MARTIN, both citizens of the United States, and residents, respectively, of Somerville, in the county of Somerset and State of New Jersey, and the borough of Manhattan, in the city, county, and State of New York, have invented a certain new and useful Improvement in Swivel Pipe-Joints, of which improvement the following is a specification.

This invention relates to joints between two pipe sections having a swivel movement relative to each other, the object being to provide an improved joint of this character which shall have a minimum amount of friction between the parts, and at the same time maintain a fluid tight joint.

The improvement claimed is hereinafter fully set forth.

In the accompanying drawings: Figure 1 is a central longitudinal section of a pipe joint, embodying our improvement; and Fig. 2, a similar section showing a slight modification.

According to the construction shown in Fig. 1, the swivel joint comprises a body portion, 1, preferably in the form of an open ended cylinder having a shoulder, 2, at the inner end, and a sleeve member formed with an intermediate cylidrical portion, 3, fitting the cylindrical body, inner and outer cylindrical portions, 5, and 11, and tapered shoulders, 4, and 9, respectively, connecting said inner and outer portions with the intermediate cylindrical portion. A packing ring, 6, of suitable material is located between the sleeve, 5, and the body portion, the outer end being tapered and the inner end being cut away to form a cavity in which is located the coiled spring, 8, bearing at one end upon the shoulder, 2, and acting to force the tapered end of the packing ring out between the tapered shoulder, 4, of the sleeve, and the wall of the body. The fluid pressure within the pipe joint also assists in this action, and presses the inner portion of the packing ring against the wall of the body portion. A metal spring ring, 7, lining the inner part of the packing ring, may be employed for assisting in holding the same against the surface of the body.

A soft metal gasket, 10, is applied between the upper end of the body and the sleeve portion, 11, and tapered shoulder, 9, the gland nut, 12, being screwed down upon the gasket, and the end of the body. The pressure of the nut upon the gasket forces the tapered end portion between the tapered shoulder of the sleeve, and the wall of the body, and thus tends to hold the sleeve central in the joint. This gasket is preferably formed of anti-friction metal which reduces the friction between the sleeve and nut and allows the joint to operate very easily when fluid under pressure is admitted into the pipe line.

The construction shown in Fig. 2 is substantially the same except that the cut away portion or cavity at the inner end of the packing ring, 6, is V-shaped in section, so that the fluid pressure entering said cavity acts to press the lips of the packing ring both outward against the surface of the body as well as inward against the sleeve and against the tapered shoulder.

In either construction, the packing ring maintains a durable fluid tight joint, and the gasket centers the sleeve in position and reduces the friction of the joint to a minimum.

The packing ring may readily be renewed at such times as may be necessary, by simply unscrewing the nut, and removing the sleeve from the body.

Having now described our invention, what we claim as new and desire to secure by Letters Patent is:

1. In a swivel pipe joint, the combination of a cylindrical body section, a cylindrical sleeve fitted therein and having a tapered shoulder and a smaller cylindrical portion, and a tapered packing ring engaging said shoulder, the wall of the body and the smaller portion of the sleeve, and provided with a cavity at its inner end subject to the fluid pressure.

2. In a swivel pipe joint, the combination of a cylindrical body section, a sleeve fitted therein and having an inner tapered shoulder and an outer tapered shoulder, a tapered packing ring engaging the inner shoulder and the wall of the body section and provided with a cavity subject to the fluid pressure, a gasket engaging the outer tapered shoulder and the inner surface of the wall, and a nut on said body for holding said gasket.

3. In a swivel pipe joint, the combination of a cylindrical body section, a cylindrical sleeve fitted therein and having a tapered shoulder, a tapered packing ring engaging said shoulder and the wall of the body section, and provided with a cavity at its inner end, and a metal spring ring lining the inner portion of the packing ring for pressing the same against the wall of the body section.

4. In a swivel pipe joint, the combination of a cylindrical body section, a sleeve fitted therein and having an inner tapered shoulder and an outer tapered shoulder, a tapered packing ring engaging the inner shoulder and the wall of the body section, a spring bearing against said packing ring, a soft metal gasket engaging the outer tapered shoulder and the inner surface of the wall of the body, and a nut for holding the gasket against the outer tapered shoulder of said sleeve.

In testimony whereof we have hereunto set our hands.

ALBERT G. ELVIN.
FREDERICK W. MARTIN.

Witnesses:
  JOHN L. MOHUN,
  A. I. DONNELLEY.